United States Patent
He et al.

(10) Patent No.: US 10,847,991 B2
(45) Date of Patent: Nov. 24, 2020

(54) MULTIPLE BIDIRECTIONAL CONVERTERS FOR CHARGING AND DISCHARGING OF ENERGY STORAGE UNITS

(71) Applicant: HUAWEI TECHNOLOGIES CO., LTD., Guangdong (CN)

(72) Inventors: Wentao He, Shenzhen (CN); Kui Zhou, Dongguan (CN); Haoren Shan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/411,635

(22) Filed: May 14, 2019

(65) Prior Publication Data
US 2019/0267827 A1 Aug. 29, 2019

Related U.S. Application Data

(63) Continuation of application No. PCT/CN2017/105825, filed on Oct. 12, 2017.

(30) Foreign Application Priority Data

Nov. 15, 2016 (CN) .......................... 2016 1 1026863

(51) Int. Cl.
*H02J 7/00* (2006.01)
*H02J 7/34* (2006.01)
(Continued)

(52) U.S. Cl.
CPC ............... *H02J 7/342* (2020.01); *H02J 7/00* (2013.01); *H02J 7/0018* (2013.01); *H02J 7/02* (2013.01);
(Continued)

(58) Field of Classification Search
CPC .......... H02J 7/022; H02J 7/342; H02J 7/0018; H02J 7/02; H02M 3/158; H02M 1/4208; H02M 7/48; H02M 7/12
(Continued)

(56) References Cited

U.S. PATENT DOCUMENTS 5,161,097 A * 11/1992 Ikeda .................. H02J 2207/20
363/124
6,043,629 A *  3/2000 Ashley .................... H02J 1/102
320/119
(Continued)

FOREIGN PATENT DOCUMENTS

CN        102593878 A    7/2012
CN        103746419 A    4/2014
(Continued)

OTHER PUBLICATIONS

"Power factor correct (PFC) basics and design considerations," TI training & videos, Texas Instruments, Published Online Jun. 27, 2017, Accessed Online Feb. 17, 2017, https://training.ti.com/power-factor-correction-pfc-topology-comparison.*
(Continued)

*Primary Examiner* — John T Trischler
(74) *Attorney, Agent, or Firm* — Fish & Richardson P.C.

(57) ABSTRACT

A charging and discharging apparatus includes, in some implementations, an alternating current charging and discharging unit, a bidirectional alternating current/direct current conversion unit, a bidirectional direct current/direct current isolated conversion unit, and a first energy storage unit that are sequentially connected in series, and further including at least one switch unit, a direct current/direct current isolated conversion unit, and a second energy storage unit. A first end of each switch unit is connected to the bidirectional direct current/direct current isolated conversion unit, a second end of each switch unit is connected to
(Continued)

US 10,847,991 B2

Page 2 a first end of the direct current/direct current isolated conversion unit, and a second end of the direct current/direct current isolated conversion unit is connected to the second energy storage unit.

10 Claims, 5 Drawing Sheets (51) Int. Cl.
  *H02J 7/02* (2016.01)
  *H02M 1/42* (2007.01)
  *H02M 3/158* (2006.01)
  *H02M 7/12* (2006.01)
  *H02M 7/48* (2007.01)
  *H02M 1/00* (2006.01)

(52) U.S. Cl.
  CPC ............ *H02J 7/022* (2013.01); *H02M 1/4208* (2013.01); *H02M 3/158* (2013.01); *H02M 7/12* (2013.01); *H02M 7/48* (2013.01); *H02J 7/34* (2013.01); *H02J 2207/20* (2020.01); *H02M 2001/0074* (2013.01); *Y02T 10/7055* (2013.01)

(58) Field of Classification Search
  USPC .................................................. 320/107, 103
  See application file for complete search history.

(56) References Cited

U.S. PATENT DOCUMENTS

| | | | | |
|---|---|---|---|---|
| 6,215,272 B1* | 4/2001 | Ohara | ............... | H01M 8/04298 320/103 |
| 6,331,365 B1* | 12/2001 | King | ............... | B60L 50/51 429/9 |
| 6,370,050 B1* | 4/2002 | Peng | ............... | H02M 3/33576 363/17 |
| 6,700,802 B2* | 3/2004 | Ulinski | ............... | H02J 3/32 307/66 |
| 6,906,933 B2* | 6/2005 | Taimela | ............... | H02J 3/32 363/34 |
| 6,919,648 B2* | 7/2005 | Bolz | ............... | F02N 11/04 290/40 C |
| 7,137,344 B2* | 11/2006 | Kumar | ............... | B60K 6/46 105/35 |
| 7,456,519 B2* | 11/2008 | Takeda | ............... | H02J 9/062 307/64 |
| 7,457,592 B2* | 11/2008 | Arayashiki | ............... | H03C 5/00 330/295 |
| 7,474,079 B2* | 1/2009 | Hashimoto | ............... | H02J 7/022 320/138 |
| 7,692,935 B2* | 4/2010 | Yamauchi | ............... | H02M 3/33584 363/16 |
| 7,796,410 B2* | 9/2010 | Takayanagi | ............... | H02J 7/045 363/37 |
| 7,821,228 B2* | 10/2010 | Zhu | ............... | H02J 7/342 320/114 |
| 7,832,513 B2* | 11/2010 | Verbrugge | ............... | B60K 6/28 180/65.31 |
| 7,889,524 B2* | 2/2011 | Lee | ............... | B60W 10/26 363/65 |
| 7,936,573 B2* | 5/2011 | Yamauchi | ............... | H02M 3/33584 363/16 |
| 7,977,819 B2* | 7/2011 | Kitanaka | ............... | B60L 9/22 307/64 |
| 8,186,466 B2* | 5/2012 | Verbrugge | ............... | B60K 6/28 180/65.275 |
| 8,188,692 B2* | 5/2012 | Kumar | ............... | B60K 6/46 318/376 |
| 8,410,634 B2* | 4/2013 | Park | ............... | H02J 3/32 307/65 |
| 8,829,826 B2* | 9/2014 | Rozman | ............... | B60W 10/08 318/376 |
| 8,860,363 B2* | 10/2014 | Ang | ............... | B60L 58/20 320/104 |
| 8,907,522 B2* | 12/2014 | Park | ............... | H02J 3/32 307/65 |
| 8,963,482 B2* | 2/2015 | Ang | ............... | H02J 7/022 320/104 |
| 9,254,799 B2* | 2/2016 | Yoshida | ............... | B60R 16/033 |
| 9,315,105 B2* | 4/2016 | Sakamoto | ............... | B60L 58/20 |
| 9,350,265 B2* | 5/2016 | Knill | ............... | H02M 7/48 |
| 9,444,285 B2* | 9/2016 | Kamiya | ............... | H02J 7/35 |
| 9,493,081 B2* | 11/2016 | Sugiyama | ............... | B60L 15/007 |
| 9,493,092 B2* | 11/2016 | Kondoh | ............... | H02J 7/34 |
| 9,499,060 B2* | 11/2016 | Kim | ............... | H02J 7/022 |
| 9,527,401 B2* | 12/2016 | Le | ............... | H01M 10/441 |
| 9,564,754 B2* | 2/2017 | Sun | ............... | H02J 4/00 |
| 9,711,962 B2* | 7/2017 | Andrea | ............... | H02H 9/002 |
| 9,758,047 B2* | 9/2017 | Hou | ............... | B60L 11/1811 |
| 9,774,269 B2* | 9/2017 | Matsubara | ............... | H02M 3/33584 |
| 9,834,102 B2* | 12/2017 | Nakaya | ............... | H02J 3/383 |
| 9,855,849 B2* | 1/2018 | Reichow | ............... | H02J 1/00 |
| 9,876,434 B2* | 1/2018 | Torrico-Bascope | ............... | H02M 3/33584 |
| 9,878,635 B1* | 1/2018 | Khaligh | ............... | B60L 3/12 |
| 9,889,752 B2* | 2/2018 | Zhou | ............... | B60L 11/1811 |
| 9,919,376 B2* | 3/2018 | Starzengruber | ............... | H02M 1/582 |
| 9,931,951 B2* | 4/2018 | Khaligh | ............... | B60L 11/1812 |
| 9,979,291 B2* | 5/2018 | Fu | ............... | H02M 3/158 |
| 9,985,473 B2* | 5/2018 | Mondal | ............... | H02M 3/156 |
| 9,997,933 B2* | 6/2018 | Huang | ............... | H02J 7/0029 |
| 10,029,631 B2* | 7/2018 | Iwashima | ............... | H02J 3/32 |
| 10,046,656 B2* | 8/2018 | Kim | ............... | H02M 7/04 |
| 10,079,496 B2* | 9/2018 | Huang | ............... | H02J 2207/40 |
| 10,097,017 B2* | 10/2018 | Greening | ............... | H02J 7/0044 |
| 10,148,124 B1* | 12/2018 | Chang | ............... | H02J 9/061 |
| 10,158,137 B2* | 12/2018 | Kwon | ............... | H02J 7/34 |
| 10,193,459 B2* | 1/2019 | Torrico-Bascope | ............... | H02M 3/33584 |
| 10,199,945 B2* | 2/2019 | Nozawa | ............... | B60L 50/51 |
| 10,277,029 B2* | 4/2019 | Pierquet | ............... | H02M 3/337 |
| 10,333,398 B2* | 6/2019 | Takahashi | ............... | H02M 3/28 |
| 10,340,810 B2* | 7/2019 | Achtzehn | ............... | H02M 3/3378 |
| 10,461,553 B2* | 10/2019 | Shimada | ............... | H02M 3/33507 |
| 10,518,725 B2* | 12/2019 | Masui | ............... | H02J 7/00 |
| 2004/0112320 A1* | 6/2004 | Bolz | ............... | F02N 11/04 123/179.28 |
| 2004/0178773 A1* | 9/2004 | Eguchi | ............... | H02J 9/061 320/140 |
| 2006/0023478 A1* | 2/2006 | Takeda | ............... | H02J 9/062 363/97 |
| 2006/0152085 A1* | 7/2006 | Flett | ............... | B60L 9/30 307/75 |
| 2006/0205366 A1* | 9/2006 | Arayashiki | ............... | H03C 5/00 455/91 |
| 2007/0139975 A1* | 6/2007 | Yamauchi | ............... | H02M 3/33584 363/16 |
| 2007/0236966 A1* | 10/2007 | Uruno | ............... | H02M 3/158 363/20 |
| 2009/0039829 A1* | 2/2009 | Zhu | ............... | H02J 7/342 320/114 |
| 2009/0086520 A1* | 4/2009 | Nishimura | ............... | H02M 3/33576 363/133 |
| 2009/0103341 A1* | 4/2009 | Lee | ............... | B60W 10/26 363/124 |
| 2009/0322148 A1* | 12/2009 | Kitanaka | ............... | B60L 9/22 307/9.1 |
| 2010/0127563 A1* | 5/2010 | Kumar | ............... | B60K 6/46 307/9.1 |
| 2010/0133900 A1* | 6/2010 | King | ............... | B60L 58/20 307/9.1 |
| 2010/0142228 A1* | 6/2010 | Yamauchi | ............... | H02M 3/33584 363/17 |
| 2010/0315043 A1* | 12/2010 | Chau | ............... | B60L 3/0046 320/134 |
| 2011/0089886 A1* | 4/2011 | Dubovsky | ............... | H02J 7/35 320/101 |

(56) References Cited

U.S. PATENT DOCUMENTS

| | | | | |
|---|---|---|---|---|
| 2011/0100735 A1* | 5/2011 | Flett | ............................ | B60K 6/46 180/65.22 |
| 2011/0133558 A1* | 6/2011 | Park | ............................ | H02J 3/32 307/66 |
| 2013/0110337 A1* | 5/2013 | Kondoh | ...................... | H02J 7/34 701/22 |
| 2013/0175867 A1* | 7/2013 | Park | ............................ | H02J 3/32 307/66 |
| 2013/0181680 A1* | 7/2013 | Chau | ........................ | B60L 3/0046 320/134 |
| 2013/0200846 A1* | 8/2013 | Ang | .......................... | B60L 50/51 320/109 |
| 2013/0257375 A1* | 10/2013 | Ang | .......................... | H02J 7/022 320/109 |
| 2013/0320911 A1* | 12/2013 | Kamiya | ...................... | H02J 7/35 320/101 |
| 2014/0009106 A1* | 1/2014 | Andrea | .................... | H02H 9/002 320/107 |
| 2014/0009981 A1* | 1/2014 | Charles Knill | .......... | H02M 7/48 363/37 |
| 2014/0055080 A1* | 2/2014 | Ishikura | .................. | H02J 7/342 320/103 |
| 2014/0183942 A1 | 7/2014 | Sugiyama | | |
| 2014/0371968 A1* | 12/2014 | Sakamoto | ................ | B60L 58/20 701/22 |
| 2015/0042159 A1* | 2/2015 | Kim | .......................... | B60L 53/20 307/10.1 |
| 2015/0175021 A1* | 6/2015 | Kim | .......................... | B60L 53/20 320/109 |
| 2015/0183329 A1* | 7/2015 | Nakaya | ...................... | B60L 53/14 307/9.1 |
| 2015/0188362 A1* | 7/2015 | Mondal | .................... | H02M 3/156 307/52 |
| 2015/0202983 A1* | 7/2015 | Le | .......................... | H01M 10/441 320/109 |
| 2015/0314387 A1* | 11/2015 | Starzengruber | ........ | B23K 9/1043 219/130.33 |
| 2016/0016479 A1* | 1/2016 | Khaligh | ................ | B60L 11/1812 363/17 |
| 2016/0052410 A1* | 2/2016 | Zhou | .................... | B60L 11/1811 320/109 |
| 2016/0079776 A1* | 3/2016 | Iguchi | ...................... | H02M 3/00 320/134 |
| 2016/0133959 A1* | 5/2016 | Kwon | .................... | H01M 8/04559 429/429 |
| 2016/0172881 A1* | 6/2016 | Birrer | .................... | H02J 7/0024 246/218 |
| 2016/0236580 A1* | 8/2016 | Hou | ...................... | B60L 11/1811 |
| 2016/0241137 A1* | 8/2016 | Sun | ........................ | H02M 3/285 |
| 2016/0268834 A1* | 9/2016 | Satyamoorthy | .......... | H02J 7/025 |
| 2016/0365803 A1* | 12/2016 | Torrico-Bascope | ...................... H02M 3/33584 |
| 2016/0380455 A1* | 12/2016 | Greening | ................ | H02J 7/0044 320/114 |
| 2017/0093157 A1* | 3/2017 | Pierquet | ................ | H02M 3/337 |
| 2017/0117731 A1* | 4/2017 | Shimada | ................ | H02M 3/335 |
| 2017/0271863 A1* | 9/2017 | Andrea | .................. | H02H 9/002 |
| 2017/0271864 A1* | 9/2017 | Andrea | .................. | H02H 9/002 |
| 2017/0271865 A1* | 9/2017 | Andrea | .................. | H02H 9/002 |
| 2017/0320396 A1* | 11/2017 | Kim | .................... | B60L 11/1811 |
| 2017/0338519 A1* | 11/2017 | Junger | .................. | H01M 10/4207 |
| 2017/0346328 A1* | 11/2017 | Meacham, II | .... | H02J 7/007184 |
| 2017/0358987 A1* | 12/2017 | Oouchi | .................. | B60L 53/18 |
| 2018/0019680 A1* | 1/2018 | Nozawa | ................ | H02M 3/33523 |
| 2018/0069429 A1* | 3/2018 | Marbach | ................ | H02J 7/345 |
| 2018/0115243 A1* | 4/2018 | Fu | ........................ | H02M 3/158 |
| 2018/0222333 A1* | 8/2018 | Khaligh | ................ | B60L 11/1812 |
| 2018/0241306 A1* | 8/2018 | Takahashi | ............... | H02M 3/28 |
| 2018/0334037 A1* | 11/2018 | Masui | ...................... | B60L 3/04 |
| 2018/0334045 A1* | 11/2018 | Bendani | ................. | H02J 7/022 |
| 2018/0351374 A1* | 12/2018 | Liu | ........................ | B60L 53/14 |
| 2019/0013683 A1* | 1/2019 | Greening | ............. | H02M 3/1582 |
| 2019/0088960 A1* | 3/2019 | Kwon | .................. | H01M 8/04753 |
| 2019/0097543 A1* | 3/2019 | Achtzehn | ............. | H02M 3/1582 |
| 2019/0131880 A1* | 5/2019 | Torrico-Bascope | ...................... H02M 3/33584 |
| 2019/0135585 A1* | 5/2019 | Nakari | .................... | B66B 5/027 |
| 2019/0140476 A1* | 5/2019 | Mondal | ................ | H02M 3/156 |
| 2019/0143822 A1* | 5/2019 | Malek | ...................... | H02J 7/00 320/109 |
| 2019/0148973 A1* | 5/2019 | Kim | ...................... | H02M 1/4258 320/109 |
| 2019/0214832 A1* | 7/2019 | Li | .......................... | H02J 7/0024 |
| 2019/0214833 A1* | 7/2019 | Li | .......................... | G01R 31/382 |
| 2019/0217732 A1* | 7/2019 | Zhou | .................... | B60L 53/30 |
| 2019/0305563 A1* | 10/2019 | Koki | ........................ | H02J 7/04 |
| 2019/0319461 A1* | 10/2019 | Zhang | .................... | H02S 40/38 |
| 2020/0062140 A1* | 2/2020 | Zhou | ........................ | H02J 7/00 |

FOREIGN PATENT DOCUMENTS

| | | | |
|---|---|---|---|
| CN | 104734312 A | | 6/2015 |
| CN | 105226989 A | | 1/2016 |
| CN | 105799529 A | | 7/2016 |
| EP | 2887491 A1 | | 6/2015 |
| JP | 2007236064 A | * | 9/2007 |
| JP | 2012161211 A | * | 8/2012 |
| JP | 5726555 B2 | * | 6/2015 |
| WO | WO-2016012032 A1 | * | 1/2016 |

OTHER PUBLICATIONS

Extended European Search Report issued in European Application No. 17872769.9 dated Jul. 5, 2019, 10 pages.

International Search Report dated Dec. 22, 2017 in corresponding International Application No. PCT/CN2017/105825.

PCT International Search Report and Written Opinion issued in International Application No. PCT/CN2017/105825 dated Dec. 22, 2017, 17 pages (with English translation).

* cited by examiner

MULTIPLE BIDIRECTIONAL CONVERTERS FOR CHARGING AND DISCHARGING OF ENERGY STORAGE UNITS

CROSS-REFERENCE TO RELATED APPLICATIONS

This application is a continuation of International Application No. PCT/CN2017/105825, filed on Oct. 12, 2017, which claims priority to Chinese Patent Application 201611026863.1, filed on Nov. 15, 2016, The disclosures of the aforementioned applications are hereby incorporated by reference in their entireties.

TECHNICAL FIELD

Embodiments of the present invention relate to electronic circuit technologies, and in particular, to a charging and discharging apparatus.

BACKGROUND

Charging and discharging apparatuses are widely applied to the fields such as vehicles and communications. For example, in the field of vehicles, current charging and discharging apparatuses in many high-end electric vehicles include an alternating current charging and discharging socket, a high-voltage power battery, a low-voltage lead-acid battery, and three power conversion modules, namely, an on-board charger, an on-board DC/DC, and an on-board inverter.

Figure 1:
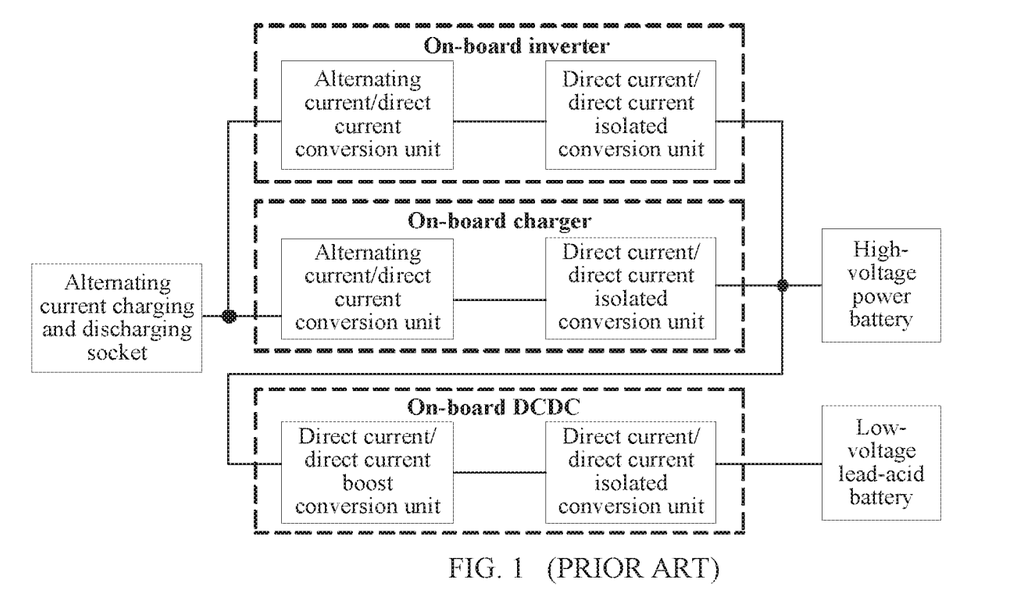
FIG. 1 is a schematic structural diagram of a charging and discharging apparatus in the prior art.

FIG. 1 is a schematic structural diagram of a charging and discharging apparatus in the prior art. As shown in FIG. 1, an on-board inverter includes an alternating current/direct current conversion unit and a direct current/direct current isolated conversion unit. A first end of the alternating current/direct current conversion unit is connected to an alternating current charging and discharging socket, a second end of the alternating current/direct current conversion unit is connected to a first end of the direct current/direct current isolated conversion unit, and a second end of the direct current/direct current isolated conversion unit is connected to a high-voltage power battery. An on-board charger includes an alternating current/direct current conversion unit and a direct current/direct current isolated conversion unit. Similarly, a first end of the alternating current/direct current conversion unit is connected to the alternating current charging and discharging socket, a second end of the alternating current/direct current conversion unit is connected to a first end of the direct current/direct current isolated conversion unit, and a second end of the direct current/direct current isolated conversion unit is connected to the high-voltage power battery. An on-board DC/DC includes a direct current/direct current boost conversion unit and a direct current/direct current isolated conversion unit. A first end of the direct current/direct current boost conversion unit is connected to the high-voltage power battery, the second end of the direct current/direct current boost conversion unit is connected to a first end of the direct current/direct current isolated conversion unit, and a second end of the direct current/direct current isolated conversion unit is connected to a low-voltage lead-acid battery.

However, in the prior art, a charging and discharging apparatus includes a relatively large quantity of units, causing a problem that the charging and discharging apparatus and a device such as an electric vehicle in which the apparatus is located are relatively heavy in weight.

SUMMARY

Embodiments of the present invention provide a charging and discharging apparatus, to reduce a weight of the charging and discharging apparatus and a weight of a device in which the charging and discharging apparatus is located.

An embodiment of the present invention provides a charging and discharging apparatus, including an alternating current charging and discharging unit, a bidirectional alternating current/direct current conversion unit, a bidirectional direct current/direct current isolated conversion unit, and a first energy storage unit that are sequentially connected in series. The charging and discharging apparatus further includes at least one switch unit, a direct current/direct current isolated conversion unit, and a second energy storage unit. A first end of each switch unit is connected to the bidirectional direct current/direct current isolated conversion unit, a second end of each switch unit is connected to a first end of the direct current/direct current isolated conversion unit, and a second end of the direct current/direct current isolated conversion unit is connected to the second energy storage unit.

Each switch unit is in an off state when the first energy storage unit is charged by using the alternating current charging and discharging unit or the first energy storage unit charges a to-be-charged device by using the alternating current charging and discharging unit, and one of the at least one switch unit is in an on state when the first energy storage unit charges the second energy storage unit.

The bidirectional alternating current/direct current conversion unit, the bidirectional direct current/direct current isolated conversion unit, and the direct current/direct current isolated conversion unit in the charging and discharging apparatus replace an alternating current/direct current conversion unit and a direct current/direct current isolated conversion unit included in an on-board inverter, an alternating current/direct current conversion unit and a direct current/direct current isolated conversion unit included in an on-board charger and a direct current/direct current boost conversion unit and a direct current/direct current isolated conversion unit included in an on-board DC/DC in the prior art. Therefore, the charging and discharging apparatus implements functions of the on-board inverter, the on-board charger, and the on-board DC/DC in the prior art, and compared with the prior art, the charging and discharging apparatus includes fewer units, thereby reducing a weight of the charging and discharging apparatus and a weight of a device in which the apparatus is located.

Optionally, the at least one switch unit is a first switch unit, a first end of the first switch unit is connected to a first end of the bidirectional direct current/direct current isolated conversion unit, a second end of the first switch unit is connected to the first end of the direct current/direct current isolated conversion unit, and the first end of the bidirectional direct current/direct current isolated conversion unit is an end connected to the bidirectional alternating current/direct current conversion unit.

The first switch unit is in an on state when a voltage value of the first energy storage unit is less than a voltage threshold, to enable the first energy storage unit to charge the second energy storage unit.

In this case, the first energy storage unit outputs a high-voltage direct current, and the high-voltage direct current flows to the bidirectional direct current/direct current isolated conversion unit. The bidirectional direct current/direct current isolated conversion unit may perform voltage conversion on the high-voltage direct current and output the converted direct current to the direct current/direct current isolated conversion unit. Further, the direct current/direct current isolated conversion unit may implement voltage step down and output the direct current on which voltage adjustment has been performed to the second energy storage unit.

Optionally, the at least one switch unit is a second switch unit, a first end of the second switch unit is connected to a second end of the bidirectional direct current/direct current isolated conversion unit, a second end of the second switch unit is connected to the first end of the direct current/direct current isolated conversion unit, and the second end of the bidirectional direct current/direct current isolated conversion unit is an end connected to the first energy storage unit.

The second switch unit is in an on state when a voltage value of the first energy storage unit is greater than or equal to a voltage threshold, to enable the first energy storage unit to charge the second energy storage unit.

In this case, the first energy storage unit outputs a high-voltage direct current, and the high-voltage direct current flows to the direct current/direct current isolated conversion unit. The direct current/direct current isolated conversion unit may implement voltage step down and output the direct current on which voltage adjustment has been performed to the second energy storage unit.

Optionally, the at least one switch unit is a first switch unit and a second switch unit, a first end of the first switch unit is connected to a first end of the bidirectional direct current/direct current isolated conversion unit, a second end of the first switch unit is connected to the first end of the direct current/direct current isolated conversion unit, and the first end of the bidirectional direct current/direct current isolated conversion unit is an end connected to the bidirectional alternating current/direct current conversion unit. A first end of the second switch unit is connected to a second end of the bidirectional direct current/direct current isolated conversion unit, and a second end of the second switch unit is connected to the first end of the direct current/direct current isolated conversion unit.

The first switch unit is in an on state and the second switch unit is in an off state when a voltage value of the first energy storage unit is less than a voltage threshold, to enable the first energy storage unit to charge the second energy storage unit.

The first switch unit is in an off state and the second switch unit is in an on state when the voltage value of the first energy storage unit is greater than or equal to the voltage threshold, to enable the first energy storage unit to charge the second energy storage unit.

When the first switch unit is in an on state and the second switch unit is in an off state, refer to the first optional manner, and details are not described herein again. When the first switch unit is in an off state and the second switch unit is in an on state, refer to the second optional manner, and details are not described herein again.

Optionally, the bidirectional alternating current/direct current conversion unit is a bridgeless power factor correction PFC circuit.

Optionally, the bidirectional direct current/direct current isolated conversion unit is a bidirectional resonant conversion circuit.

Optionally, the direct current/direct current isolated conversion unit is an LLC circuit.

The embodiments of the present invention provide the charging and discharging apparatus, including the alternating current charging and discharging unit, the bidirectional alternating current/direct current conversion unit, the bidirectional direct current/direct current isolated conversion unit, and the first energy storage unit that are sequentially connected in series. The charging and discharging apparatus further includes the at least one switch unit, the direct current/direct current isolated conversion unit, and the second energy storage unit. The first end of each switch unit is connected to the bidirectional direct current/direct current isolated conversion unit, the second end of each switch unit is connected to the first end of the direct current/direct current isolated conversion unit, and the second end of the direct current/direct current isolated conversion unit is connected to the second energy storage unit. Each switch unit is in an off state when the first energy storage unit is charged by using the alternating current charging and discharging unit or the first energy storage unit charges the to-be-charged device by using the alternating current charging and discharging unit, and one of the at least one switch unit is in an on state when the first energy storage unit charges the second energy storage unit. The charging and discharging apparatus implements the functions of the on-board inverter, the on-board charger, and the on-board DC/DC in the prior art, and compared with the prior art, the charging and discharging apparatus includes fewer units, thereby reducing the weight of the charging and discharging apparatus and the weight of the device in which the apparatus is located.

DESCRIPTION OF EMBODIMENTS

For a problem that a charging and discharging apparatus in the prior art and a device such as an electric vehicle in which the apparatus is located are relatively heavy in weight due to that the charging and discharging apparatus includes a relatively large quantity of units, embodiments of the present invention provide a charging and discharging apparatus.

Figure 2:
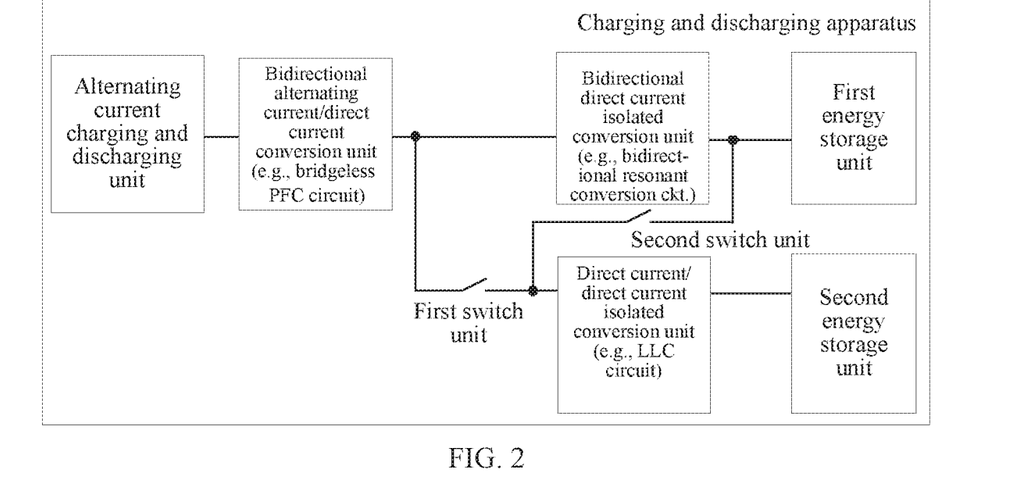
FIG. 2 is a schematic structural diagram of a charging and discharging apparatus according to an embodiment of the present invention.

FIG. 2 is a schematic structural diagram of a charging and discharging apparatus according to an embodiment of the present invention. As shown in FIG. 2, the apparatus includes an alternating current charging and discharging unit, a bidirectional alternating current/direct current conversion unit, a bidirectional direct current/direct current isolated conversion unit, and a first energy storage unit that are sequentially connected in series, and the apparatus further includes at least one switch unit (where an example in which the at least one switch unit is a first switch unit and a second switch unit is used in FIG. 2), a direct current/direct current isolated conversion unit, and a second energy storage unit. A first end of each switch unit is connected to the bidirectional direct current/direct current isolated conversion unit, a second end of each switch unit is connected to a first end of the direct current/direct current isolated conversion unit, and a second end of the direct current/direct current isolated conversion unit is connected to the second energy storage unit.

Each switch unit is in an off state when the first energy storage unit is charged by using the alternating current charging and discharging unit or the first energy storage unit charges a to-be-charged device by using the alternating current charging and discharging unit, and one of the at least one switch unit is in an on state when the first energy storage unit charges the second energy storage unit.

Figure 3:
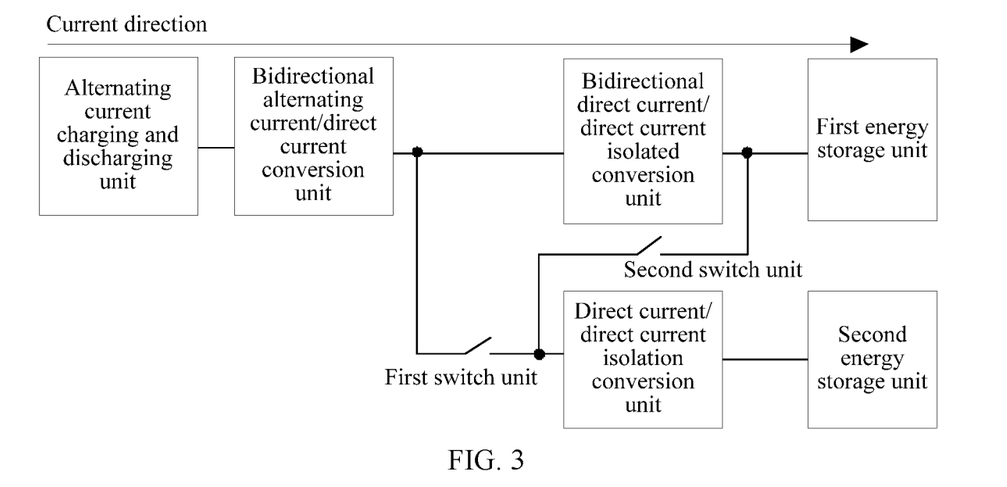
FIG. 3 is a first schematic diagram of a flow direction of a current according to an embodiment of the present invention.

For example, when the charging and discharging apparatus is applied to an electric vehicle, FIG. 3 is a first schematic diagram of a flow direction of a current according to an embodiment of the present invention. As shown in FIG. 3, an external alternating current of the electric vehicle passes through the alternating current charging and discharging unit, the bidirectional alternating current/direct current conversion unit, and the bidirectional direct current/direct current isolated conversion unit, to charge the first energy storage unit. Optionally, the alternating current charging and discharging unit may be an alternating current charging and discharging socket, an alternating current charging and discharging interface, or the like. The bidirectional alternating current/direct current conversion unit is configured to convert the input alternating current into a direct current and output the direct current into the bidirectional direct current/direct current isolated conversion unit. The bidirectional direct current/direct current isolated conversion unit is configured to perform voltage conversion on the input direct current and output the converted direct current into the first energy storage unit, to charge the first energy storage unit. The first energy storage unit may be a battery, and for example, may be a high-voltage power battery. In conclusion, that the charging and discharging apparatus charges the first energy storage unit is equivalent to a process of charging a high-voltage power battery by using an on-board charger in the prior art.

Figure 4:
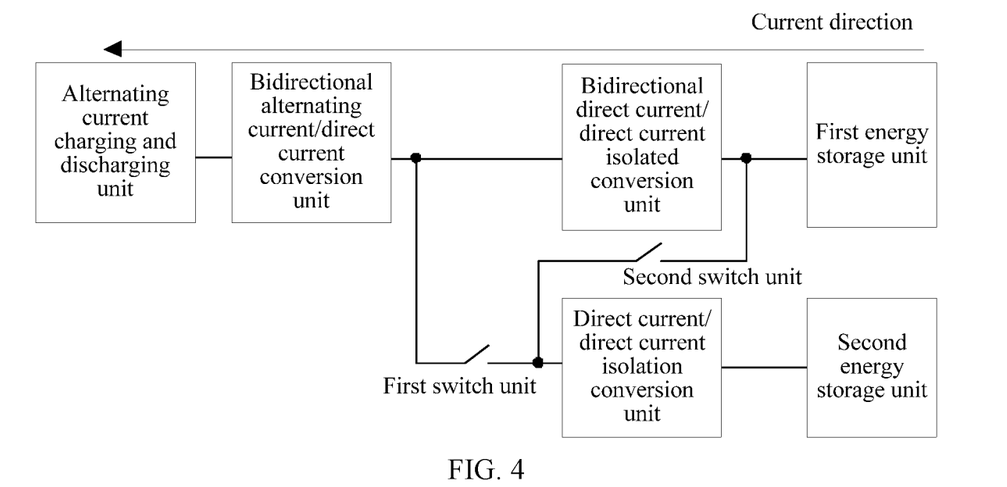
FIG. 4 is a second schematic diagram of a flow direction of a current according to an embodiment of the present invention.

A process of charging the to-be-charged device by the charging and discharging apparatus is as follows: FIG. 4 is a second schematic diagram of a flow direction of a current according to an embodiment of the present invention. As shown in FIG. 4, a high-voltage direct current of the first energy storage unit passes through the bidirectional direct current/direct current isolated conversion unit, the bidirectional alternating current/direct current conversion unit, and the alternating current charging and discharging unit, to charge the to-be-charged device connected to the alternating current charging and discharging unit. Optionally, the bidirectional direct current/direct current isolated conversion unit is configured to perform voltage conversion on the high-voltage direct current and output the converted direct current into the bidirectional alternating current/direct current conversion unit. The bidirectional alternating current/direct current conversion unit is configured to convert the input direct current into an alternating current and output the alternating current into the alternating current charging and discharging unit, to charge the to-be-charged device connected to the alternating current charging and discharging unit. In conclusion, that the charging and discharging apparatus charges the to-be-charged device is equivalent to a process of charging a to-be-charged device by using an on-board inverter in the prior art.

Figure 5:
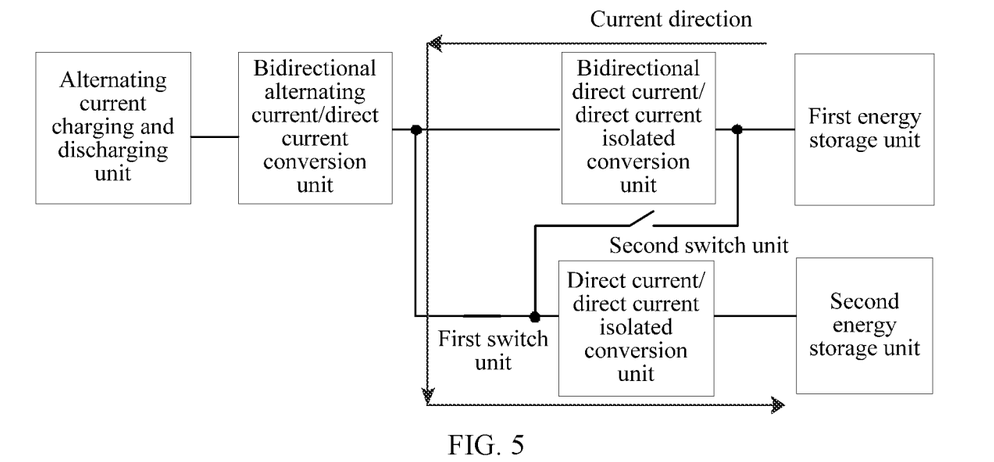
FIG. 5 is a third schematic diagram of a flow direction of a current according to an embodiment of the present invention.
Figure 6:
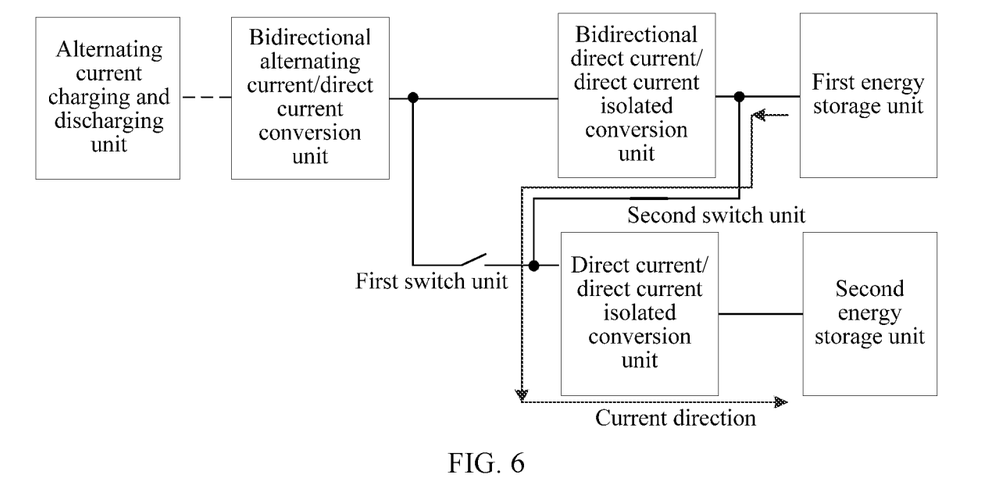
FIG. 6 is a fourth schematic diagram of a flow direction of a current according to an embodiment of the present invention.

A process of charging the second energy storage unit by the first energy storage unit is as follows: FIG. 5 is a third schematic diagram of a flow direction of a current according to an embodiment of the present invention. As shown in FIG. 5, the first energy storage unit outputs a high-voltage direct current, and the high-voltage direct current flows through the first switch unit to the direct current/direct current isolated conversion unit. The direct current/direct current isolated conversion unit is configured to convert the high-voltage direct current into a low-voltage direct current and output the low-voltage direct current into the second energy storage unit. FIG. 6 a fourth schematic diagram of a flow direction of a current according to an embodiment of the present invention. As shown in FIG. 6, the first energy storage unit outputs a high-voltage direct current, and the high-voltage direct current flows through the second switch unit to the direct current/direct current isolated conversion unit. The direct current/direct current isolated conversion unit is configured to convert the high-voltage direct current into a low-voltage direct current and output the low-voltage direct current into the second energy storage unit. In conclusion, that the first energy storage unit charges the second energy storage unit is equivalent to a function of performing charging by using an on-board DC/DC in the prior art.

This embodiment of the present invention provides the charging and discharging apparatus. The bidirectional alternating current/direct current conversion unit, the bidirectional direct current/direct current isolated conversion unit, and the direct current/direct current isolated conversion unit in the charging and discharging apparatus replace an alternating current/direct current conversion unit and a direct current/direct current isolated conversion unit included in the on-board inverter, an alternating current/direct current conversion unit included in the on-board charger, and a direct current/direct current isolated conversion unit, a direct current/direct current boost conversion unit, and a direct current/direct current isolated conversion unit included in the on-board DC/DC in the prior art. Compared with the prior art, the charging and discharging apparatus includes fewer units, thereby reducing a weight of the charging and discharging apparatus and a weight of a device in which the apparatus is located.

Figure 7:
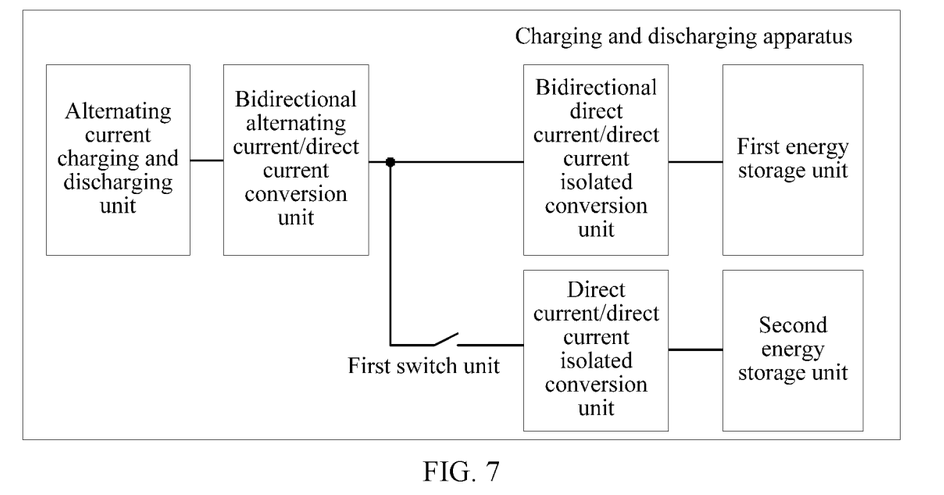
FIG. 7 is a schematic structural diagram of a charging and discharging apparatus according to another embodiment of the present invention.

In a first optional manner, the at least one switch unit is a first switch unit. FIG. 7 is a schematic structural diagram of a charging and discharging apparatus according to another embodiment of the present invention. As shown in FIG. 7, a first end of the first switch unit is connected to a first end of the bidirectional direct current/direct current isolated conversion unit, and a second end of the first switch unit is connected to the first end of the direct current/direct current isolated conversion unit. The first end of the bidirectional direct current/direct current isolated conversion unit is an end connected to the bidirectional alternating current/direct current conversion unit. The first switch unit is in an on state when a voltage value of the first energy storage unit is less than a voltage threshold, to enable the first energy storage unit to charge the second energy storage unit. In this case, the first energy storage unit outputs a high-voltage direct current, and the high-voltage direct current flows to the bidirectional direct current/direct current isolated conversion unit. The bidirectional direct current/direct current isolated conversion unit may perform voltage conversion on the high-voltage direct current and output the converted direct current to the direct current/direct current isolated conversion unit. Further, the direct current/direct current isolated conversion unit may implement voltage step down and output the direct current on which voltage adjustment has been performed to the second energy storage unit. It should be noted that the voltage threshold may be set based on an actual case.

Figure 8:
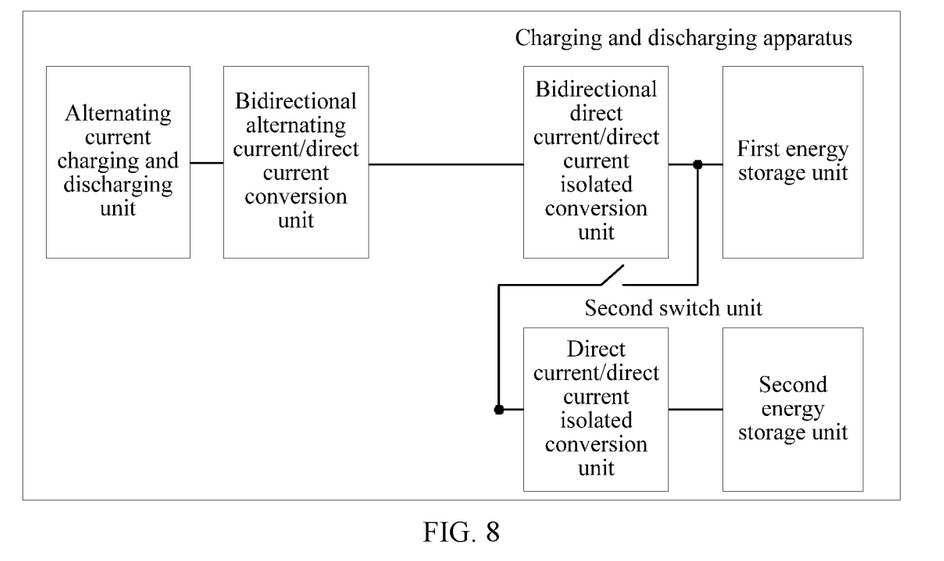
FIG. 8 is a schematic structural diagram of a charging and discharging apparatus according to still another embodiment of the present invention.

In a second optional manner, the at least one switch unit is a second switch unit. FIG. 8 is a schematic structural diagram of a charging and discharging apparatus according to still another embodiment of the present invention. As shown in FIG. 8, a first end of a second switch unit is connected to a second end of the bidirectional direct current/direct current isolated conversion unit, and a second end of the second switch unit is connected to the first end of the direct current/direct current isolated conversion unit. The second end of the bidirectional direct current/direct current isolated conversion unit is an end connected to the first energy storage unit. The second switch unit is in an on state when a voltage value of the first energy storage unit is greater than or equal to a voltage threshold, to enable the first energy storage unit to charge the second energy storage unit. In this case, the first energy storage unit outputs a high-voltage direct current, and the high-voltage direct current flows to the direct current/direct current isolated conversion unit. The direct current/direct current isolated conversion unit may implement voltage step down and output the direct current on which voltage adjustment has been performed to the second energy storage unit.

In a third optional manner, as shown in FIG. 2, the at least one switch unit is a first switch unit and a second switch unit. A first end of the first switch unit is connected to a first end of the bidirectional direct current/direct current isolated conversion unit, and a second end of the first switch unit is connected to the first end of the direct current/direct current isolated conversion unit. The first end of the bidirectional direct current/direct current isolated conversion unit is an end connected to the bidirectional alternating current/direct current conversion unit. A first end of the second switch unit is connected to a second end of the bidirectional direct current/direct current isolated conversion unit, and a second end of the second switch unit is connected to the first end of the direct current/direct current isolated conversion unit. The first switch unit is in an on state and the second switch unit is in an off state when a voltage value of the first energy storage unit is less than a voltage threshold, to enable the first energy storage unit to charge the second energy storage unit. The first switch unit is in an off state and the second switch unit is in an on state when the voltage value of the first energy storage unit is greater than or equal to the voltage threshold, to enable the first energy storage unit to charge the second energy storage unit. It should be noted that in this case, when the first switch unit is in an on state and the second switch unit is in an off state, refer to the first optional manner, and details are not described herein again. When the first switch unit is in an off state and the second switch unit is in an on state, refer to the second optional manner, and details are not described herein again.

In this embodiment of the present invention, the bidirectional direct current/direct current isolated conversion unit has a voltage adjustment function. Therefore, when the first energy storage unit charges the second energy storage unit, a voltage value of the generated direct current varies depending on whether the high-voltage direct current output by the first energy storage unit passes through or does not pass through the bidirectional direct current/direct current isolated conversion unit, so that a voltage provided for the second energy storage unit also varies.

Optionally, the bidirectional alternating current/direct current conversion unit is a bridgeless Power Factor Correction (PFC) circuit.

Optionally, the bidirectional direct current/direct current isolated conversion unit is a bidirectional resonant conversion circuit.

Optionally, the direct current/direct current isolated conversion unit is an LLC circuit.

Figure 9:
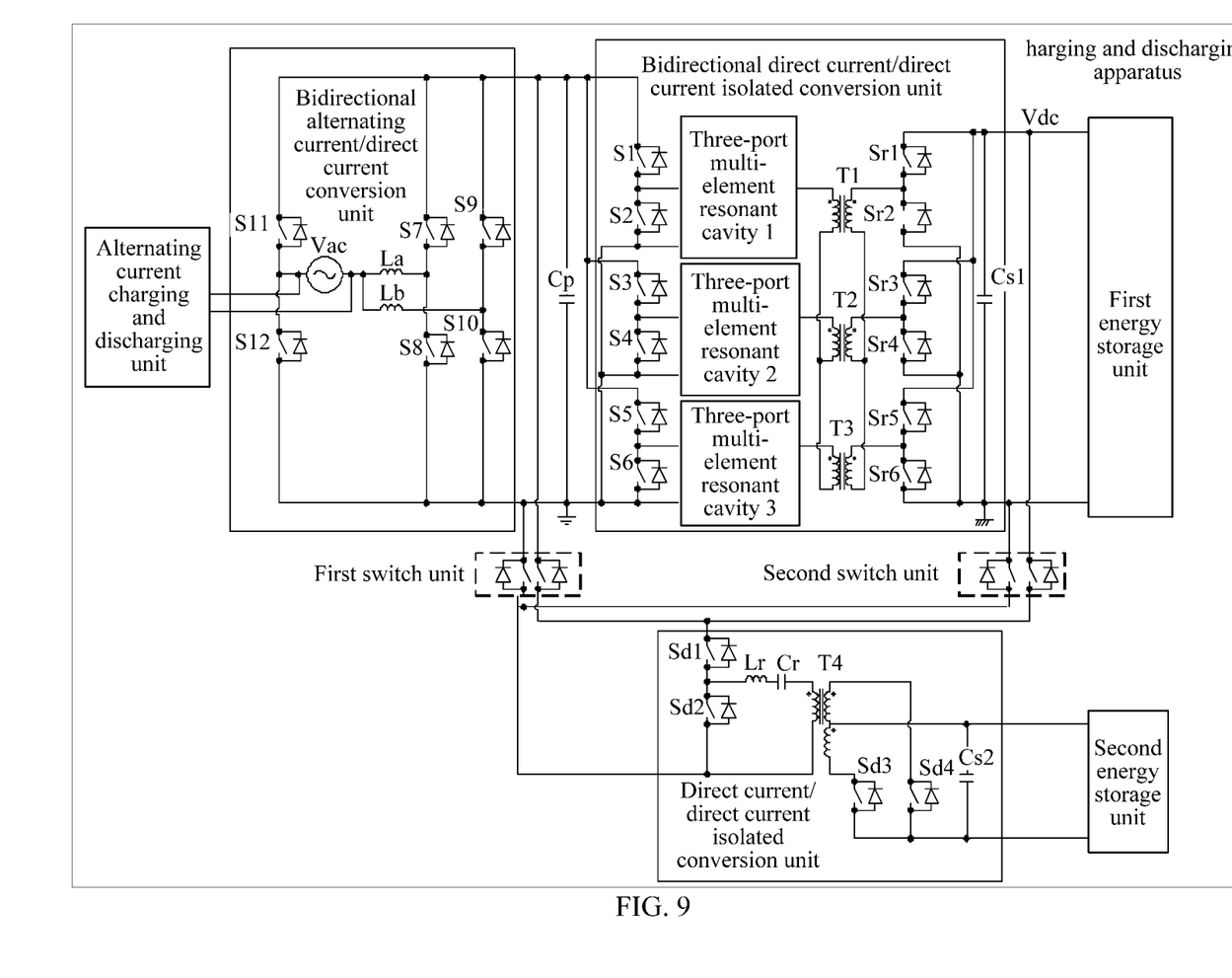
FIG. 9 is a schematic structural diagram of a charging and discharging apparatus according to yet another embodiment of the present invention.

For example, FIG. 9 is a schematic structural diagram of a charging and discharging apparatus according to yet another embodiment of the present invention. As shown in FIG. 9, the apparatus includes an alternating current charging and discharging unit, a bidirectional alternating current/direct current conversion unit, a bidirectional direct current/direct current isolated conversion unit, and a first energy storage unit that are sequentially connected in series, and further includes a first switch unit, a second switch unit, a direct current/direct current isolated conversion unit, and a second energy storage unit. A first end of the first switch unit is connected to a first end of the bidirectional direct current/direct current isolated conversion unit, and a second end of the first switch unit is connected to a first end of the direct current/direct current isolated conversion unit. The first end of the bidirectional direct current/direct current isolated conversion unit is an end connected to the bidirectional alternating current/direct current conversion unit. A first end of the second switch unit is connected to a second end of the bidirectional direct current/direct current isolated conversion unit, and a second end of the second switch unit is connected to the first end of the direct current/direct current isolated conversion unit. The first switch unit is in an on state and the second switch unit is in an off state when a voltage value of the first energy storage unit is less than a voltage threshold, to enable the first energy storage unit to charge the second energy storage unit. The first switch unit is in an off state and the second switch unit is in an on state when the voltage value of the first energy storage unit is greater than or equal to the voltage threshold, to enable the first energy storage unit to charge the second energy storage unit. A second end of the direct current/direct current isolated conversion unit is connected to the second energy storage unit.

The bidirectional alternating current/direct current conversion unit includes switch tubes S7, S8, S9, S10, S11, and S12, an alternating current power supply Vac, an inductor La, and an inductor Lb. S7 and S8 are connected in series, S9 and S10 are connected in series, and S11 and S12 are connected in series. A series circuit including S7 and S8, a series circuit including S9 and S10, and a series circuit including S11 and S12 are connected in parallel. One end of the alternating current power supply Vac is connected to S11 and the other end is connected to the inductor La. In addition, the alternating current power supply Vac is further connected to the alternating current charging and discharging unit, and the other end of La is connected to the series circuit including S7 and S8. One end of Lb is connected to La and the other end is connected to the series circuit including S9 and S10.

The bidirectional direct current/direct current isolated conversion unit includes switch tubes S1 to S6 that are connected in series and a capacitor Cp. One end of the capacitor Cp is connected to a positive electrode of a bus, and the other end is connected to a negative electrode of the bus. The bidirectional direct current/direct current isolated conversion unit further includes switch tubes Sr1 to Sr6 that are connected in series and a capacitor Cs1. One end of the capacitor Cs1 is connected to a positive electrode of the first energy storage unit and the other end is connected to a negative electrode of the first energy storage unit. The bidirectional direct current/direct current isolated conversion unit further includes three three-port multi-element resonant cavities and three transformers T1, T2, and T3. A first end of a multi-element resonant cavity 1 is connected between S1 and S2, a second end of the multi-element resonant cavity 1 is connected to the negative electrode of the bus, a third end of the multi-element resonant cavity 1 is connected to a primary-side winding of T1, and a secondary-side winding of T1 is connected between Sr1 and Sr2. Similarly, a first end of a multi-element resonant cavity 2 is connected between S3 and S4, a second end of the multi-element resonant cavity 2 is connected to the negative electrode of the bus, a third end of the multi-element resonant cavity 2 is connected to a primary-side winding of T2, and a secondary-side winding of T2 is connected between Sr3 and Sr4. A first end of a multi-element resonant cavity 3 is connected between S5 and S6, a second end of the multi-element resonant cavity 3 is connected to the negative electrode of the bus, a third end of the multi-element resonant cavity 3 is connected to a primary-side winding of T3, and a secondary-side winding of T3 is connected between Sr5 and Sr6.

The direct current/direct current isolated conversion unit includes switch tubes Sd1 to Sd4, an inductor Lr, a capacitor Cr, a capacitor Cs2, and a transformer T4. Sd1 and Sd2 are connected in series, one end of Lr is connected between Sd1 and Sd2 and the other end is connected to Cr, the other end of Cr is connected to one end of a primary-side winding of T4, and the other end of the primary-side winding of T4 is connected to Sd2. A first end of a secondary-side winding of T4 is connected to Sd3, a second end is connected to Sd4, and a third end is connected to Cs2.

The first switch unit includes two switch tubes, and the second switch unit also includes two switch tubes.

Optionally, the switch tube may be an insulated gate bipolar transistor (Insulated Gate Bipolar Transistor, IGBT for short), a Metal Oxide Semiconductor Field Effect Transistor (MOSFET), or the like.

This embodiment of the present invention provides the charging and discharging apparatus. The bidirectional alternating current/direct current conversion unit, the bidirectional direct current/direct current isolated conversion unit, and the direct current/direct current isolated conversion unit in the charging and discharging apparatus replace an alternating current/direct current conversion unit and a direct current/direct current isolated conversion unit included in an on-board inverter, an alternating current/direct current conversion unit and a direct current/direct current isolated conversion unit included in an on-board charger and a direct current/direct current boost conversion unit and a direct current/direct current isolated conversion unit included in an on-board DC/DC in the prior art. Compared with the prior art, the charging and discharging apparatus includes fewer units, thereby reducing a weight of the charging and discharging apparatus and a weight of a device in which the apparatus is located.

What is claimed is:

1. A charging and discharging apparatus, comprising an alternating current charging and discharging unit, a bidirectional alternating current/direct current conversion unit, a bidirectional direct current/direct current isolated conversion unit, and a first energy storage unit that are sequentially connected in series,
wherein the apparatus further comprises a first switch unit and a second switch unit, a direct current/direct current isolated conversion unit, and a second energy storage unit, wherein a respective first end of each of the first switch unit and the second switch unit is connected to the bidirectional direct current/direct current isolated conversion unit, a respective second end of each of the first switch unit and the second switch unit is connected to a first end of the direct current/direct current isolated conversion unit, and a second end of the direct current/direct current isolated conversion unit is connected to the second energy storage unit;
wherein each of the first switch unit and the second switch unit is in an off state when the first energy storage unit is charged by using the alternating current charging and discharging unit or the first energy storage unit charges a to-be-charged device by using the alternating current charging and discharging unit, and wherein the charging and discharging apparatus is operable such that when a voltage value of the first energy storage unit is less than a voltage threshold, the second switch is in the off state, and the first switch unit is in an on state to enable the first energy storage unit to charge the second energy storage unit, wherein current flows from the first energy storage unit, via the bidirectional direct current/direct current isolated conversion unit and the direct current/direct current isolated conversion unit, to the second energy storage unit, and
wherein the charging and discharging apparatus is operable such that when a voltage value of the first energy storage unit is greater than or equal to a voltage threshold, the first switch is in the off state, and the second switch unit is in the on state to enable the first energy storage unit to charge the second energy storage unit, wherein current flows from the first energy storage unit, via the direct current/direct current isolated conversion unit but not via the bidirectional direct current/direct current isolated conversion unit, to the second energy storage unit.

2. The charging and discharging apparatus according to claim 1, wherein the first end of the first switch unit is connected to a first end of the bidirectional direct current/direct current isolated conversion unit, the second end of the first switch unit is connected to the first end of the direct current/direct current isolated conversion unit, and the first end of the bidirectional direct current/direct current isolated conversion unit is connected to the bidirectional alternating current/direct current conversion unit.

3. The charging and discharging apparatus according to claim 1, wherein the first end of the second switch unit is connected to an end of the bidirectional direct current/direct current isolated conversion unit, the second end of the second switch unit is connected to the first end of the direct current/direct current isolated conversion unit, and the end of the bidirectional direct current/direct current isolated conversion unit is connected to the first energy storage unit.

4. The charging and discharging apparatus according to claim 1, wherein the first end of the first switch unit is connected to a first end of the bidirectional direct current/direct current isolated conversion unit, the second end of the first switch unit is connected to the first end of the direct current/direct current isolated conversion unit, the first end of the bidirectional direct current/direct current isolated conversion unit is connected to the bidirectional alternating current/direct current conversion unit, the first end of the second switch unit is connected to a second end of the bidirectional direct current/direct current isolated conversion unit, and the second end of the second switch unit is connected to the first end of the direct current/direct current isolated conversion unit.

5. The charging and discharging apparatus according to claim 1, wherein the bidirectional alternating current/direct current conversion unit comprises a bridgeless power factor correction (PFC) circuit.

6. The charging and discharging apparatus according to claim 1, wherein the bidirectional direct current/direct current isolated conversion unit comprises a bidirectional resonant conversion circuit.

7. The charging and discharging apparatus according to claim 1, wherein the direct current/direct current isolated conversion unit comprises an LLC circuit.

8. The charging and discharging apparatus according to claim 1, wherein when the first switch unit is in the on state and the second switch is in the off state, the first energy storage unit outputs a direct current that flows to the bidirectional direct current/direct current isolated conversion unit, wherein the bidirectional direct current/direct current isolated conversion unit is operable to perform voltage conversion on the direct current and to output the converted direct current to the direct current/direct current isolated conversion unit, wherein the direct current/direct current isolated conversion unit is operable to implement voltage step down with respect to the converted direct current and to provide an output direct current to the second energy storage unit.

9. The charging and discharging apparatus according to claim 1, wherein when the second switch is in the on state and the first switch unit is in the off state, the first energy storage unit outputs a direct current that flows to the direct current/direct current isolated conversion unit, wherein the direct current/direct current isolated conversion unit is operable to implement voltage step down and provide an output direct current to the second energy storage unit.

10. The charging and discharging apparatus according to claim 9, wherein when the second switch is in the on state and the first switch unit is in the off state, the first energy storage unit outputs a direct current that flows to the direct current/direct current isolated conversion unit, wherein the direct current/direct current isolated conversion unit is operable to implement voltage step down and provide an output direct current to the second energy storage unit.

* * * * *

UNITED STATES PATENT AND TRADEMARK OFFICE
CERTIFICATE OF CORRECTION

PATENT NO. : 10,847,991 B2
APPLICATION NO. : 16/411635
DATED : November 24, 2020
INVENTOR(S) : Wentao He, Kui Zhou and Haoren Shan Page 1 of 1

It is certified that error appears in the above-identified patent and that said Letters Patent is hereby corrected as shown below:

In the Specification

In Column 1, Line 11, delete "15, 2016," and insert -- 15, 2016. --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*